Patented Mar. 4, 1947

2,416,931

UNITED STATES PATENT OFFICE 2,416,931

RING CLOSURE OF POLYNUCLEAR QUINONES WITH TETRACHLORIDES OR TETRABROMIDES OF TITANIUM OR ZIRCONIUM

Hans Z. Lecher, Plainfield, and Mario Scalera and Warren S. Forster, Somerville, N. J., assignors to American Cyanamid Company, New York, N. Y., a corporation of Maine No Drawing. Application July 19, 1944, Serial No. 545,738

20 Claims. (Cl. 260—316)

This invention relates to a new process for converting polynuclear quinones into compounds containing a ring system of a higher order.

The term "polynuclear quinones" is used throughout the specification and claims to refer to a polynuclear compound containing at least two fused rings and also containing carbonyl groups connected by the atomic grouping >C=C< or by a conjugated system of such groups. These polynuclear quinones are reducible to the corresponding hydroquinones which are usually referred to as "leuco compounds" and a great many of the products are vat dyestuffs.

It is common in the art to effect ring closure in some polynuclear quinones through the connection of carbon atoms that were originally members of different rings and which atoms originally were connected with hydrogen. The new polycyclic compounds obtained by the ring closure possess a ring system of a higher order and many of these compounds are important vat dyestuffs.

The additional rings formed by the ring closure may be carbocyclic or heterocyclic. As examples of the formation of additional carbocyclic rings there may be mentioned the formation of dibenzanthrones from dibenzanthronyls and of 3,4,8,9-dibenzopyrene-5,10-quinone from bz - 1-benzoylbenzanthrone. As examples of the formation of additional heterocyclic rings there may be mentioned the conversion of di-and polyanthrimides to the corresponding mono-and polycarbazoles such as, e. g., the conversion of 1,1' dianthrimide into 1,1' - dianthrimide-2,2'-carbazole, the conversion of 1,1'4'1" trianthrimide into 1,1'4'1"-trianthrimide-2,2'3'2" - dicarbazole, the conversion of 1,1'5'1" trianthrimide into 1,1'5'1" trianthrimide 2,2'6'2' bis carbazole, the conversion of 4,4-bis benzoylamino-1,1-dianthrimide, of 1 5'-bisbenzoylamino-1,1' - dianthrimide, and of 5 5'-bis benzoylamino dianthrimide into the corresponding carbazoles. the conversion of 1.2'-dianthrimide and of 1,2'6'1" trianthrimide into the corresponding carbazoles. Another example for the closure of an additional heterocyclic ring is the conversion of bz-1-benzanthronyl-1'-amino anthraquinone into bz-1-benzanthronyl-1'-amino anthraquinone-2,2'-acridine.

In the past these ring closures have been effected with various condensing agents, some acid and some alkaline. Among such agents known to the prior art there may be mentioned aluminum chloride, ferric chloride, zinc chloride, concentrated sulfuric acid or oleum, chlorosulfonic acid, hydrofluoric acid and aqueous or alcoholic caustic alkali.

Most of these reagents suffer under various disadvantages. The most widely used agent which is also most generally applicable is aluminum chloride. It has been common in the past to effect ring closures with aluminum chloride, but this has resulted in undesirable side reactions such as chlorination, isomerization, hydrolysis of sensitive groups, tar formation and the like. Some of these drawbacks have been thought to be overcome at least partially by using the aluminum chloride in conjunction with complex forming solvents such as tertiary bases (pyridine), acid chlorides, liquid sulfur dioxide, nitriles and the like. The use of such solvents limits the effectiveness of aluminum chloride as it reduces its activity as a condensing agent and greatly increases the cost of the operation. Other difficulties which are mechanical in nature, such as objectionable thickening of the charge, are frequently encountered in the reaction. The other ring closing reagents which have also been used in the prior art are not as generally applicable as aluminum chloride and also share the disadvantage of producing undesired side reactions and otherwise adversely affect the yield of the process.

The present invention is directed to an improved process of condensing polynuclear quinones by ring closure to produce a ring system of a higher order by connecting carbon atoms from different aromatic rings through removal of the hydrogen attached thereto. The essential feature of the present invention lies in the use of a new class of reagents, namely, the tetrachlorides or tetrabromides of titanium and zirconium. By means of the process of the present invention ring closures proceed smoothly and in high yields. It is also possible to produce products of a high degree of purity at moderate cost.

The improved results obtainable by means of the present invention are quite surprising because in the Friedel-Crafts reaction, in which aluminum chloride is generally used, titanium tetrachloride shows very low effectiveness whereas in the ring closure of polynuclear quinones, to which the present invention relates, the tetrachlorides of titanium and zirconium give markedly improved results over aluminum chloride.

The reactions may be somewhat complicated and it is not fully known just how the reagents of the present invention behave. It is, therefore, not desired to restrict the invention to any theory of action. We believe, however, that an important factor may be the great tendency of the tetrahalides of titanium and zirconium to form addition products with the polynuclear quinones. We believe that at least in many cases the present process proceeds by the formation of such addition products followed by rearrangement on heating where this is structurally possible. The latter reaction should result in the elimination of hydrogen halide when the new linkage takes place between the two carbon atoms originally in different aromatic rings. The amount of hydrogen halide liberated in such reaction should correspond to two mols for each linkage formed and this agrees with the available evidence.

It is an established fact that the product obtained by the first steps of the process of the present invention is a very stable and difficultly soluble complex containing titanium or zirconium. The stability of the complex in most cases is considerably greater than the stability of any addition products of the tetrahalides with the polynuclear quinones which are the starting mixture.

The formation of the relatively stable and relatively insoluble complexes permits purification by filtration which is often an advantage. The complexes may then be hydrolyzed by treatment with alkalies or acids and in general the new compounds are obtained in a partly reduced state. In the case of a typical reaction such as the formation of the carbazole from 1, 1'-dianthrimide, the product appears to be about one-half in the reduced and one-half in the quinonoid form.

These partly reduced compounds may be oxidized to the completely quinoid structure by means of mild oxidizing agents. It is convenient in many cases to produce a leuco compound, that is to say, a completely reduced compound by vatting the titanium or zirconium complex in the conventional manner with hydrosulfite and alkali or with zinc and alkali. This vatting procedure results in hydrolysis of the complex. The titania may then be removed by filtration and the leuco compound can be precipitated from the filtrate by oxidation in the usual manner, for example, by means of air. This procedure results in many cases in an additional purification and with some products presents marked economic advantages and is therefore preferred.

It is possible to carry out the reactions of the present invention in the absence of solvents. However, operating conditions and in some cases yields are better, and the reaction proceeds more smoothly, when a suitable organic solvent is used. The term "solvent" is probably not entirely apt in some cases. It is not necessary that either the polynuclear quinone or the tetrahalide be completely dissolved in the liquid and the organic liquid may therefore be considered as operating partly as a diluent or viscosity reducing agent. The present invention is of particular advantage when titanium tetrachloride or tetrabromide are used with solvents as these compounds are miscible with a great many inert organic liquids. In general, titanium tetrachloride gives as good results as titanium tetrabromide and its considerably lower cost makes it preferable.

It is an advantage of the present invention that the amount of tetrahalide to be used is not at all critical. Theoretically two mols are required for each ring closure. A small excess is usually advantageous although not completely necessary. A larger excess does no harm but neither does it effect an improvement which would justify the additional cost.

Theoretically the reactions of the present invention require anhydrous conditions. However, the tetrahalide used reacts with water and therefore small amounts of moisture are not objectionable provided there is sufficient excess of tetrahalide to destroy it. This is a real operating advantage as it is often considerably more difficult and sometimes more expensive to produce absolutely anhydrous reaction conditions.

It is a further advantage of the present invention that the temperature is not critical. Reaction takes place even at fairly low temperatures somewhat above room temperature but is too slow to be practically advantageous at temperatures below about 100° C. The preferred temperature range lies between 100 and 200° C. However, no sharp or critical control of temperature is necessary which simplifies operating problems on a large scale.

It is an advantage that the reactions may be carried out at atmospheric pressure by choosing the appropriate tetrahalide or organic solvent so that the combination has a boiling point higher than the desired reaction temperature for the particular quinone used. While as stated above, the temperature is not in any way critical, there will in general be optimum temperatures or, narrower temperature ranges for each particular quinone. These optimum temperatures fall between 100 and 200° C. and in every case the operator will choose the best temperature for the particular quinone.

The order of steps in the process of the present invention is also not critical. Thus for example, the polynuclear quinone to be condensed may be heated in an organic solvent or diluent to the desired reaction temperature and then the tetrahalide gradually added as the reaction proceeds with some quinones. This is the easiest procedure. Another suitable method is to dissolve or disperse the tetrahalide in the organic solvents, heat to reaction temperatures and add the polynuclear quinone gradually, for example, in the form of a solution or a slurry in the same solvent or diluent. It is possible to mix all the ingredients at room temperature and then heat the mixture to reaction temperature.

In spite of the smooth reaction and good yields obtainable by the process of the present invention, there is sometimes a delay in initiation of the reaction at the desired reaction temperature. In large scale operations the delay is objectionable. Fortunately where delay occurs it may be entirely avoided by adding a very small amount of a former charge. Apparently some autocatalytic effect is obtained.

Where a solvent or diluent is used which boils at a higher temperature than the tetrahalide, a fairly common case with the relatively low boiling titanium tetrachloride, excess of the tetrahalide may be removed by distilling off from the reaction mixture after the first steps of the reaction have been completed.

The condensation charge may be further processed in various ways and in its broader aspect in so far as it is concerned with the condensation reaction itself, the present invention is not restricted to any particular method of working up the initial crude condensation charge. Nevertheless, there are several methods of handling the charge which present advantages.

The primary complex of the metal compound and the condensed product which is ordinarily not soluble to any material extent in organic solvents may be filtered off and then dissolved in concentrated sulfuric acid. After dilution with water the polynuclear condensation product precipitates and may be recovered by filtration whereas titanium sulfate or zirconium sulfate remains in solution. There is some danger of hydrolysis of the sulfate and for this reason it is often advantageous to add alkali metal sulfates to the sulfuric acid solution which tends to keep the titanium or zirconium sulfate in solution.

Another method consists in adding alkali such as caustic alkali or alkali carbonate to the condensation charge and stripping off any organic solvents present. The complex is decomposed by alkali producing a partially reduced compound. The mixture is then subjected to vatting to produce the leuco compound of the condensed polynuclear quinone which is filtered off from the undissolved titanium or zirconium dioxide. The filtration should be effected under conditions which prevent premature oxidation of the leuco compound. Thus for example, it may be carried out under an atmosphere of nitrogen. The dyestuff is recovered from the filtrate in the conventional manner by oxidation with air.

It is an advantage of the present invention that a very pure product is normally obtained. However, in some cases it is desirable to further purify or brighten the condensed quinone which may be effected by conventional after-treatments with oxidizing agents such as bichromate and dilute sulfuric acid or hypochlorite.

The vatting procedure as described above as one of the methods of recovering the condensed quinone is of particular value in certain cases where the ring closure reaction is not complete or where it may take two different courses. Often only one product is vattable and therefore, the vatting procedure may frequently result in the separation of the desired compound from undesired side products. The additional purification resulting from the vatting procedure is particularly important with polynuclear quinones which are sparingly soluble and which have presented a very difficult purification problem. Thus for example, when producing 1,1'5'1"-trianthrimide 2,2'6'2"'-dicarbazole from the corresponding trianthrimide, the process of the present invention using the vatting method of purification gives yields of from 80 to 90% of the theory of the product and of very high purity, 20 to 10% of byproducts being separated in the form of non-vattable metal complexes. When ring closures of the prior art are used not only are the reactions less smooth and the yields less satisfactory, but the purificiation requires drastic and repeated acid pasting and oxidation which further decreases the yield and increases the cost.

The present invention permits obtaining important practical advantages for operations on a technical scale. High yields of ring closure products of high purity are obtained at moderate cost. As many of the products are vat dyestuffs of a large commercial importance the present invention represents an advance of material practical importance.

The invention will be described in greater detail in connection with the following specific examples in which the parts are by weight.

*Example 1*

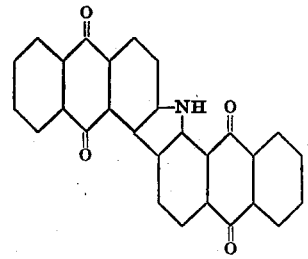

10 parts of 1,2'-dianthrimide are mixed with 106 parts of orthodichlorobenzene and 21 parts of titanium tetrachloride. The mixture is maintained at reflux (about 174°) for some hours. The excess titanium tetrachloride is distilled from the mixture which is then filtered. The cake is washed with orthodichlorobenzene and alcohol and then steamed in the presence of soda ash to remove traces of the solvent. The slurry is vatted in the usual manner and filtered, and from the thus clarified red-orange vat is obtained by aeration a reddish brown solid. By oxidation with excess sodium hypochlorite, a bright orange-red dyestuff is obtained which is violet in concentrated sulfuric acid and dyes cotton reddish brown shades.

*Example 2*

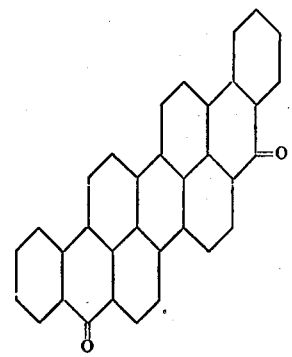

10 parts of benz-1, benz-1', dibenzanthronyl are mixed with 41.4 parts of titanium tetrachloride and 152 parts of orthodichlorobenzene. The mixture is kept at reflux for some hours, the excess titanium tetrachloride is distilled off, and the slurry filtered. The black cake is washed with orthodichlorobenzene and alcohol and steamed. The water slurry is filtered, the filter cake is washed with water and dried. The dried cake is ground and stirred into 25 parts of 98% sulfuric acid per part of solid and the mixture stirred for several hours ot 20°–30°. The paste is drowned into water, the brown-black slurry is filtered and the cake washed acid free. The solid is vatted in the usual manner and from the filtered deep red-violet vat is obtained a deep blue-almost black solid by aeration and filtration. The dye is blue in concentrated sulfuric acid and dyes cotton a deep blue from a violet vat.

Example 3

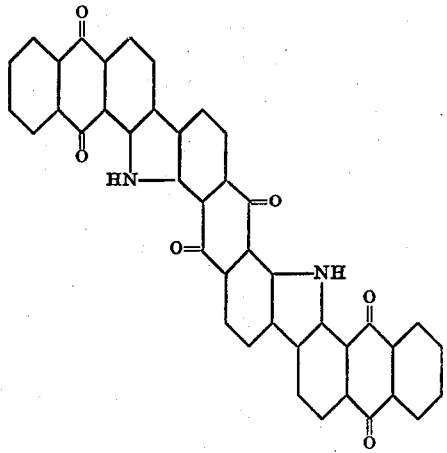

10 parts of 1,1',5',1''-trianthrimide are suspended in 67 parts of orthodichlorobenzene, and the slurry is heated at gentle reflux or somewhat below that temperature. To the heated slurry is added gradually 29.3 parts of titanium tetrachloride dissolved in 50 parts of orthodichlorobenzene. The dark red slurry becomes black as the reaction proceeds. After some hours, the excess titanium tetrachloride is distilled out and the slurry remaining is filtered and washed with orthodichlorobenzene. The recovered titanium tetrachloride is suitable for reuse.

The cake is steamed free of solvent in the presence of soda ash, and is then vatted in the usual manner. From the filtered red-brown vat is obtained by aeration a yellow-brown solid which is filtered off, washed and oxidized in aqueous suspension with sodium hypochlorite. The dye is obtained as a bright orange solid, in yields of 80% to 90% of the theoretical. It dyes cotton reddish yellow shades of excellent fastness. The dyestuff is a deep blue in 98% sulfuric acid in which it is only very sparingly soluble.

Example 4

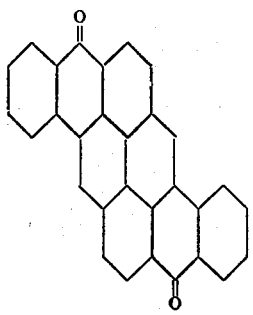

10 parts of 2,2'-dimethyl-1,1'-dianthraquinonyl are added to 123 parts of orthodichlorobenzene and 32.6 parts of titanium tetrachloride. The mixture is held at reflux for some hours. The excess titanium tetrachloride is distilled out and the slurry filtered. The solid obtained is washed with orthodichorobenzene and alcohol, and the gray-black material is then freed of traces of solvent by steaming with soda ash. The water slurry is vatted in the usual manner and from the deep red filtered vat is obtained by aeration an orange solid which is filtered off and washed. The product is green in sulfuric acid and on dilution with water a deep blue-green color is produced before the orange dyestuff itself is precipitated out. Cotton is dyed orange from the vat.

Example 5

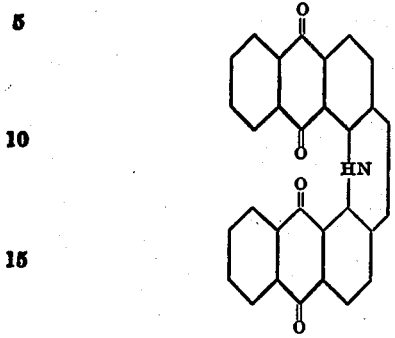

20 parts of 1,1'-dianthrimide are introduced into 200 parts of titanium tetrachloride and the slurry is heated four hours at reflux. The slurry becomes black and thick. The melt is cooled and poured into 1000 parts of 5% hydrochloric acid, and the resulting slurry is filtered. The solid material is washed with 5% hydrochloric acid until the washings test negatively for titanium, and then acid free with boiling water. The cake obtained is dried and stirred for 1½ hours in 460 parts of 98% sulfuric acid at 110°. The acid paste is drowned in 3000 parts of water, boiled, filtered, and the product thus precipitated washed acid free. The acid free solid is slurried in 750 parts of water and oxidized with sodium hypochlorite to a bright orange. The dye is obtained in excellent yields.

Example 6

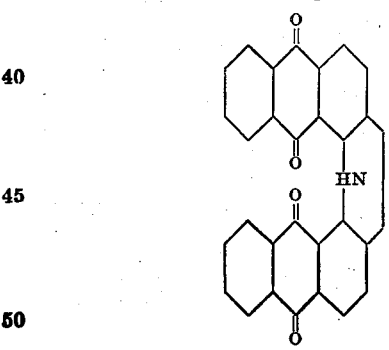

10 parts of 1,1'-dianthrimide are suspended in 63.7 parts of monochlorobenzene. The suspension is heated to about 120° and 30.2 parts of titanium tetrachloride are gradually added. The slurry becomes black. After some time the slurry is filtered and the solid thus obtained washed free of titanium tetrachloride with chlorobenzene. The washed solid is steamed free of solvent in the presence of caustic soda and air is blown into the slurry which changes from a deep red-brown to yellow. The slurry is filtered and washed free of alkali, and the moist cake is stirred in 183 parts of 98% sulfuric acid at 80°-90° for one hour. After cooling somewhat, the slurry is drowned in 1000 parts of water, filtered and washed acid free and dried. The dried product is stirred into 147 parts of 98% sulfuric acid and heated at 70°-80° for 90 minutes, and finally drowned in 1000 parts of water. To the acid slurry is added sodium dichromate for oxidation of the crude dye to a yellow-orange which is filtered off and washed acid free. The product dyes cotton a bright green-yellow, and is obtained in excellent yields.

Example 7

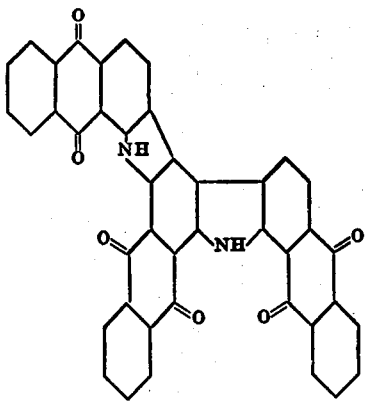

114 parts of titanium tetrachloride are mixed with 130 parts of orthodichlorobenzene and heated. To this solution is gradually added a suspension of 39 parts of 1,1',4',1''-trianthrimide in 260 parts of orthodichlorobenzene. When addition is complete, another 260 parts of orthodichlorobenzene is added to thin the melt. The mixture is heated at gentle reflux, and after some time the excess titanium tetrachloride is distilled out and the black solid remaining is filtered off and washed with the solvent. The solid is freed from solvent by steaming in the presence of soda ash and vatted in the usual manner. The vat is filtered. On aeration a dark brown solid is obtained which is filtered off, washed, reslurried in 15-20% sulfuric acid and oxidized with sodium dichromate. The final product, which dyes cotton bright red-brown shades, is obtained in yields of 80% to 90% of the theoretical.

Example 8

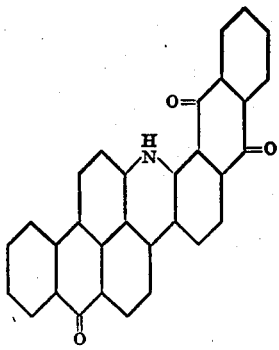

10 parts of benz-1', benzanthronyl-1-aminoanthraquinone are added to 102 parts of orthodichlorobenzene and 30.8 parts of titanium tetrachloride and this mixture is kept at reflux for some hours. The excess titanium tetrachloride is distilled out, and the slurry filtered. The filter cake is washed with orthodichlorobenzene and alcohol, and then steamed in the presence of soda ash to remove traces of solvent. The water slurry is filtered and the cake is washed and dried. The dried solid, jet black in color, is stirred up in 25 parts of 98% sulfuric acid per part of solid and stirred at 20°-30° for several hours to form a smooth paste. The paste is drowned into a large volume of water, the slurry is filtered and the solid washed free of acid. The solid is vatted in the usual manner. The deep blue vat is clarified by filtration, aerated and filtered. The green-black solid is dried. The dyestuff so obtained is green in concentrated sulfuric acid, and dyes cotton an olive green shade from a deep blue vat.

Example 9

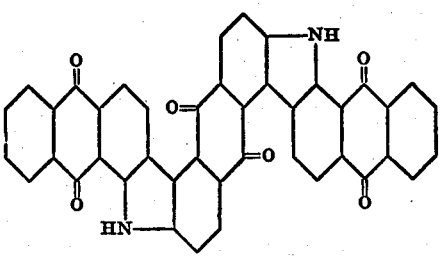

10 parts of 1,2',6',1''-trianthrimide are mixed with 117 parts of orthodichlorobenzene and 29.2 parts of titanium tetrachloride. The mixture is maintained at reflux for some hours and the excess titanium tetrachloride is distilled out. The thick slurry is filtered and the solid obtained is washed with orthodichlorobenzene and alcohol and steamed. The slurry is vatted to a dark red-brown vat which on filtration and aeration precipitates a red solid. This is purified by oxidation with sodium hypochlorite. The final dyestuff is a deep bright blue in concentrated sulfuric acid, and dyes cotton attractive red-brown shades.

Example 10

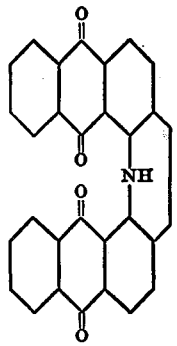

50 parts of zirconium tetrachloride are introduced into 333 parts of orthodichlorobenzene. To this mixture heated at 140°-150° are added slowly 20 parts of 1,1'-dianthrimide and the slurry is heated for several hours at reflux. The black mass is filtered and the solid is washed with dichlorobenzene, and steamed free of solvent in the presence of a caustic soda. The brown slurry is vatted in the usual manner and from the filtered vat the crude dye is obtained by aerating and filtering. The solid is dried, introduced into 20 parts of 91% sulfuric acid (per part of solid) and stirred at 20°-30° for some hours. The acid slurry is drowned in 1200 parts of water and sodium dichromate added in excess for oxidation. The dyestuff is obtained by filtration of the slurry and washing the filter cake.

Example 11

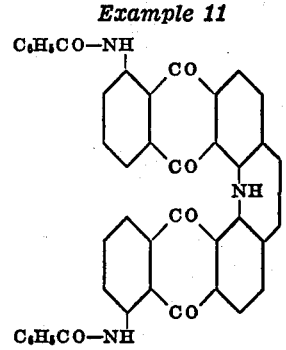

13.4 parts 5,5'-dibenzoylamino-1,1'-dianthrimide are stirred with 80 parts monochlorobenzene and then 38.0 parts titanium tetrachloride are added. The mass is warmed to about 100° when there is a brisk evolution of hydrochloric acid gas. After about an hour at this temperature, the dark colored reaction product is filtered and washed free of titanium tetrachloride with dry benzene. This product is then separated from titanium salts by vatting in the usual manner, and filtering the vat. The solution is aerated until complete precipitation of the dye has occurred, it is filtered and washed free of alkali. It is slurried in 200 parts 20% sulfuric acid and oxidized with 3.0 parts sodium dichromate, whereby its shade is considerably brightened. Cotton is dyed a bright yellow-orange shade from a yellow-brown vat.

*Example 12*

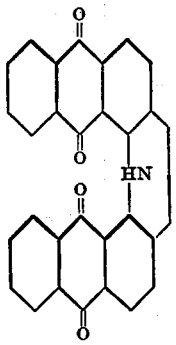

20 parts of 1,1'-dianthrimide are slurried with 97.8 parts of ortho dichlorobenzene. The slurry is heated and maintained at 170–180° while 117 parts of titanium tetrabromide dissolved in 130.5 parts of ortho dichlorobenzene are added slowly. Hydrogen bromide is evolved throughout the reaction.

The reaction mixture is maintained at reaction temperature for one hour after addition has been completed, whereupon the slurry is allowed to cool while stirring.

The cooled reaction mixture is filtered; the cake is washed with dichlorobenzene to remove excess titanium tetrabromide, and then with alcohol. The cake is finally steamed free of traces of solvent while alkaline from the addition of soda ash.

The slurry resulting from steaming is vatted in the usual manner and the vat is filtered. By aeration of the vat the dyestuff is obtained which is identical to the product of Example 6.

The crude dyestuff may be further purified by treatment with sodium hypochlorite.

We claim:

1. A process of ring closing polynuclear quinones through the connection of carbon atoms originally members of different aromatic rings to produce compounds containing at least one additional ring, said additional ring being selected from the group consisting of carbocyclic and mononitrogen heterocyclic rings, which comprises reacting at elevated temperature a polynuclear quinone capable of such ring closure with a condensing agent selected from the group consisting of tetrachlorides and tetrabromides of titanium and zirconium.

2. A process of ring closing polynuclear quinones through the connection of carbon atoms originally members of different aromatic rings to produce compounds containing at least one additional ring, said additional ring being selected from the group consisting of carbocyclic and mononitrogen heterocyclic rings, which comprises reacting at elevated temperature a polynuclear quinone capable of such ring closure with titanium tetrachloride.

3. A process for converting polynuclear quinones into quinones having at least one additional ring formed by the connection of carbon atoms originally members of different aromatic rings which comprises reacting at elevated temperature a polynuclear quinone having two aromatic rings connected through a nitrogen atom capable of forming a part of a heterocyclic ring, said rings having carbon atoms capable of ring closure to form a heterocyclic ring containing the nitrogen atom, the reaction being effected with a condensing agent selected from the group consisting of tetrachlorides and tetrabromides of titanium and zirconium.

4. A process for converting polynuclear quinones into quinones having at least one additional ring formed by the connection of carbon atoms originally members of different aromatic rings which comprises reacting at elevated temperature a polynuclear quinone having two aromatic rings connected through a nitrogen atom capable of forming a part of a heterocyclic ring, said rings having carbon atoms capable of ring closure to form a heterocyclic ring containing the nitrogen atom, the reaction being effected by means of titanium tetrachloride.

5. A process for converting anthrimides into carbazoles through the connection of carbon atoms originally members of different aromatic rings which comprises reacting at elevated temperature an anthrimide capable of such ring closure with a condensing agent selected from the group consisting of tetrachlorides and tetrabromides of titanium and zirconium.

6. A process for converting anthrimides into carbazoles through the connection of carbon atoms originally members of different aromatic rings which comprises reacting at elevated temperature an anthrimide capable of such ring closure with titanium tetrachloride.

7. A process for converting alpha-alpha' anthrimides into carbazoles through the connection of carbon atoms originally members of different aromatic rings which comprises reacting at elevated temperature an alpha-alpha' anthrimide capable of such ring closure with a condensing agent selected from the group consisting of tetrachlorides and tetrabromides of titanium and zirconium.

8. A process for converting alpha-alpha' anthrimides into carbazoles through the connection of carbon atoms originally members of different aromatic rings which comprises reacting at elevated temperature an alpha-alpha' anthrimide capable of such ring closure with titanium tetrachloride.

9. A process for converting 1,1',4',1''-trianthrimide into 1,1',4',1''-trianthrimide-2,2',3'.2''-dicarbazole which comprises reacting the trianthrimide with a condensing agent selected from the group consisting of tetrachlorides and tetrabromides of titanium and zirconium.

10. A process for converting 1,1',4',1''-trianthrimide into 1,1',4',1''-trianthrimide-2,2',3'.2''-dicarbazole which comprises reacting the trianthrimide with titanium tetrachloride.

11. A process for converting 1,1',5',1''-trianthrimide into 1,1'5'1''-trianthrimide-2,2',6',2''-dicarbazole which comprises reacting the trianthrimide with a condensing agent selected from the group consisting of tetrachlorides and tetrabromides of titanium and zirconium.

12. A process for converting 1,1',5',1''-trianthrimide into 1,1'5'1''-trianthrimide-2,2',6'2'''-dicarbazole which comprises reacting the trianthrimide with titanium tetrachloride.

13. A method according to claim 1 in which the reaction takes place in the presence of an inert organic liquid.

14. A method according to claim 3 in which the reaction takes place in the presence of an inert organic liquid.

15. A method according to claim 5 in which the reaction takes place in the presence of an inert organic liquid.

16. A method according to claim 7 in which the reaction takes place in the presence of an inert organic liquid.

17. A method according to claim 9 in which the reaction takes place in the presence of an inert organic liquid.

18. A method according to claim 11 in which the reaction takes place in the presence of an inert organic liquid.

19. A method according to claim 1 in which the reaction is effected at a temperature between 100° and 200° C.

20. A method according to claim 2 in which the reaction is effected at a temperature between 100° and 200° C.

HANS Z. LECHER.
MARIO SCALERA.
WARREN S. FORSTER.

REFERENCES CITED

The following references are of record in the file of this patent:

UNITED STATES PATENTS

| Number | Name | Date |
|---|---|---|
| 2,092,295 | Van Peski et al. | Sept. 7, 1937 |
| 2,188,776 | Lulek | Jan. 30, 1940 |

FOREIGN PATENTS

| Number | Country | Date |
|---|---|---|
| 16,271 | British | 1910 |